(12) United States Patent
Bennett (10) Patent No.: US 7,207,486 B1
(45) Date of Patent: *Apr. 24, 2007

(54) COMBINED OPTICAL AND RADIO FREQUENCY TAG READER

(75) Inventor: James D. Bennett, Austin, TX (US)

(73) Assignee: Intermec IP Corp., Everett, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/010,630

(22) Filed: Dec. 13, 2004

Related U.S. Application Data (63) Continuation of application No. 09/695,718, filed on Oct. 23, 2000, now Pat. No. 6,830,181, which is a continuation of application No. 09/247,460, filed on Feb. 9, 1999, now abandoned.

(60) Provisional application No. 60/074,145, filed on Feb. 9, 1998.

(51) Int. Cl.
*G06F 19/00* (2006.01)
*G06Q 30/00* (2006.01)
*G06K 17/00* (2006.01)
*G06K 7/10* (2006.01)

(52) U.S. Cl. ............... 235/385; 235/440; 235/462.01; 235/462.46; 235/472.02

(58) Field of Classification Search .......... 235/462.01, 235/462.13, 462.15, 462.43, 462.46, 462.45, 235/472.01, 472.02, 385, 375, 470, 451, 235/440, 454, 384, 487, 383; 705/20; 700/225, 700/226; 340/5.39, 10.52
See application file for complete search history.

(56) References Cited

U.S. PATENT DOCUMENTS

| | | | | |
|---|---|---|---|---|
| 5,382,784 A | * | 1/1995 | Eberhardt | 235/462.46 |
| 5,557,096 A | * | 9/1996 | Watanabe et al. | 235/384 |
| 5,640,002 A | * | 6/1997 | Ruppert et al. | 235/462.46 |
| 5,801,371 A | * | 9/1998 | Kahn et al. | 235/472.01 |
| 5,814,799 A | * | 9/1998 | Swartz et al. | 235/383 |
| 5,825,045 A | * | 10/1998 | Koenck et al. | 235/472.01 |
| 5,874,724 A | * | 2/1999 | Cato | 235/492 |
| 6,830,181 B1 | * | 12/2004 | Bennett | 235/440 |

* cited by examiner

*Primary Examiner*—Jared J. Fureman (57) ABSTRACT

A system and method is described which utilizes a dual function reader device, which may be a hand-held inventory control device, which first performs an optical read of an optical bar code on a carrier unit, then based on the identification or other information obtained from the optical read a RF read is made of a RF tag attached to, or within, the carrier unit. An indicator light on the carrier unit illuminates when the optical read is completed, which allows an operator to visually verify that the optical read has transpired for the desired carrier unit. The RF tag provides data regarding the inventory of the goods stored within, or on, the carrier unit, the temperature of the goods, the shelf-life of the goods, the source and/or destination of the carrier unit and/or the goods, or other information. Data can also be written to the RF tag by the reader.

28 Claims, 11 Drawing Sheets

COMBINED OPTICAL AND RADIO FREQUENCY TAG READER

CROSS-REFERENCE TO RELATED APPLICATION

The present application is a continuation of application Ser. No. 09/695,718 filed Oct. 23, 2000, now U.S. Pat. No. 6,830,181, which is a continuation of application Ser. No. 09/247,460 filed Feb. 9, 1999, now abandoned; said application Ser. No. 09/247,460 claims the benefit unit 35 USC 119(e) of U.S. Provisional Application No. 60/074,145, filed Feb. 9, 1998, which is hereby incorporated by reference herein in its entirety.

BACKGROUND OF THE INVENTION

1. Field of the Invention

The present invention relates to a system and method for performing an optical read and a RF read on a carrier unit. More particularly, the present invention relates to a system and method for performing an optical read prior to establishing communication between a RF interrogation device and a RF tag, and more particularly to a system and method for performing a bar code read prior to establishing communication between a RF interrogation device and a RF tag.

2. Description of the Related Art

Given the fast pace of commerce today, it is imperative that the movement of articles of manufacture ("goods") from one location to another be tracked. Goods must be identified quickly, including information concerning the source of the goods, the location of the goods and the destination of the goods. When goods are stacked on pallets in a warehouse, on a loading dock, in a railcar, or in any similar temporary storage environment, it is imperative that the identification of the goods be made quickly and relatively inexpensively so inventory of the goods can be had as the goods are transported further down the commerce stream without undue delay.

The use of passive RF transponder devices is common. These devices require no internal power source and can be manufactured relatively inexpensively in mass quantities. In a passive tag system, a radio transponder uses radio frequency energy in a RF interrogation device (tag reader) to communicate with a passive RF tag. An energizing signal is transmitted by the RF interrogating device, which creates an energizing field. This field powers up the passive transponder RF tags within the field and enables the RF tags to transmit their identity, and other data, to the interrogating device.

Regarding RF tags, there are several common varieties. RF tags for articles, or goods, are typically passive, deriving all their operational power from a RF interrogation signal. Active tags having a battery or other internal power source are typically used for vehicle, or other large object, tracking and/or identifying. A passive/active RF tag includes a passive receiver section and an active processing, storage and/or transmitting section. One-bit tags are generally used in an electronic article surveillance (EAS) system in retail stores as a security measure to protect against theft. For one-bit tags, the logical state of the security bit is detected by an interrogation device near the store exit. An alarm will sound if the article containing the RF tag passes through an interrogation signal from the interrogation device with an incorrectly coded tag, i.e. a tag for an unpaid article coded as not yet being permitted to leave the store premises.

For passive RF tag operation, frequently a principle called backscatter modulation is used for data communication from the RF tag to the RF interrogating device. The energizing field created by the interrogating device is typically in the form of a carrier wave signal at a fixed frequency. The energy of the transmitted carrier wave signal is received by the coil, or antenna, of the RF tag, is rectified, and is used to power the RF tag. The carrier may be in the form of a header that is transmitted for a sufficient period of time, e.g. 30 milliseconds, to enable the RF tag to "charge up" prior to communicating with the interrogating device. After the charge up period, the RF tag device is able to transmit control signals, timing signals, data or otherwise communicate with the interrogating device.

The RF tag generates a signal for the interrogating device in the form of a data stream, which may include a clock signal and data stored in the RF tag. This generated signal may be in the form of a modified manchester encoded signal at a second frequency (e.g. 10 KHz) that is shifted from the original interrogating signal (e.g. 915 MHz) by the clock rate of the RF tag. The data stored in the RF tag is used within the RF tag to drive a shorting, or shunt, transistor connected across the RF tag antenna. This has the effect of changing the reflectivity of the RF tag antenna with respect to the interrogating signal from the interrogating device and causes some of the received energy from the interrogating device to be reflected back towards a receiver on the interrogating device. The RF tag acts as a field disturbance device by reflecting the incident RF interrogation signal in a coded manner. The energy reflected by the RF tag may take the form of data packets. A simple receiver on the interrogating device, using the RF tag signal as a local oscillator, can decode the received signal from the RF tag and extract the encoded data.

Optical scanning devices are used to read a bar code printed on a label which is attached to individual goods or attached to a shipping container, a storage container, a box, a shipping pallet, or to any similar container, herein referred to as a "carrier unit", for transporting or temporarily storing goods. Optical scanners typically perform a read of one-dimensional coded images (e.g. bar codes) or a read of two-dimensional coded images. The two-dimensional codes typically include more information than the one-dimensional variety, but two-dimensional readers typically cost more than one-dimensional readers.

Performing an optical read on a bar code has associated problems. The operator of the reader must be in line of sight with the bar code and must be close enough for optimum performance of the reader. A dirty scanning window on the reader, or a dirty or torn bar code label will cause a misread leading to errors. Additionally, information encoded in the bar code cannot be changed without printing another bar code that contains the new information.

Using a RF tag reader also has associated problems. In a large storage facility, such as a warehouse, using a RF tag reader alone to identify and track goods may be difficult and/or inefficient. A RF tag reader sends out an interrogation signal which is responded to by one or more tags which have received the interrogation signal using a chosen preestablished protocol. Unfortunately, the physical location of the carrier unit used to store the goods may be indiscernible.

Neither an optical reader nor a RF reader can, by itself, quickly and accurately ascertain both the physical location of the desired carrier unit or individual goods and identify, and read from and/or write to a RF tag associated with the desired carrier unit or individual goods.

SUMMARY OF THE INVENTION

Using the system and method of the present invention which includes the combined functionality of an optical bar code reader and a RF tag reader, information in regard to an individual carrier unit, or the individual goods associated therewith, can be ascertained quickly and efficiently. The physical location of the carrier unit or individual goods can also be ascertained. Since a bar code label typically includes only basic information about the carrier unit or goods, such as the identity of the goods, or other limited scope of information, a RF tag may be used in conjunction with a bar code label to supplement the information needed concerning the carrier unit and/or the goods.

RF tags are wireless responsive devices attached to or embedded within articles of commerce or other objects to be communicated with by an interrogation device using RF communication or other wireless communication scheme. Each responsive device contains within its memory or otherwise stored within, a communication sequence, or tag sequence, for a RF tag which is unique to and identifies the individual responsive device. Also contained within each responsive device is data which corresponds to information describing the goods to which it is associated, such as the source of the goods, the goods' destination price, preferred storage temperature, current temperature, weight, etc.

The responsive device may be interrogated at a point of sale terminal, such as at a store checkout counter, or on a loading dock, in a warehouse, in a truck, etc. Any number of stationary or hand-held devices may be used to transmit an interrogation signal to attempt to communicate with each of the plurality of responsive devices.

In the present invention, a dual function reader device is used to scan an optical bar code attached to a carrier unit, which includes a storage container, shipping pallet, or other temporary carrier for storing goods in commerce. An optical scanner portion of the dual function reader reads the bar code which provides data to the device and causes an indicator light disposed on the bar code label to illuminate, indicating to the operator of the scanner that the bar code for the desired carrier unit has been read. The bar code includes data corresponding to the identity of the goods stored with the carrier unit, or the identity of the carrier unit itself. A RF tag button disposed on the carrier unit could be pushed by an operator to enable the RF tag associated with the carrier unit to enable the RF tag to communicate with the RF read portion of the reader.

The data read from the bar code label may be the address of a RF tag attached to the goods and/or attached to the carrier unit. An RF tag reader portion of the dual function reader uses the address obtained from the optical read operation to address the individual RF tag associated with the carrier unit. The reader then communicates with the RF tag of the carrier unit to obtain more detailed information regarding the goods, such as the source, the destination, the storage temperature, the current temperature, weight sensing information, bacteria sensing information, shelf-life information, etc. Information about the carrier unit itself is also obtained, regarding the inventory of goods stored with the carrier unit, the source of the carrier unit, the destination of the carrier unit, the last usage of the carrier unit, etc.

A small low-powered radio is attached to the carrier unit, where, in reporting mode, the radio periodically wakes up and transmits status information to a base station or to an access point for a wired or wireless infrastructure network. In status mode, a base station addresses a particular carrier unit's RF tag and then establishes communication with the RF tag to obtain status information regarding the carrier unit and/or the associated goods.

Moreover, other aspects of the present invention will become apparent with further reference to the drawings and specification which follow.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

In commerce today, articles of commerce, or goods, are typically transported from manufacturer to wholesaler to retailer by boat, plane, train or truck in shipping containers, boxes, crates, or truck trailers, and/or stored on shipping pallets or other similar shipping platforms for temporarily holding or storing goods. These containers or pallets are generally described herein as "carrier units". At some point in this commerce stream, the goods are typically stored, at least temporarily, in a depot or warehouse awaiting further transport to their ultimate destination. Inventory control of the numerous carrier units and associated goods in a warehouse setting presents a formidable task. Carrier units being loaded or unloaded from planes, boats, trains, trucks or other shipping vehicle may utilize a passive RF tag system to identify and track the goods in transit. Passive tag systems built in accordance with the present invention may be utilized to detect and identify a particular carrier unit, or good, and the associated price, and other information, for goods in transit, in storage, or being purchased by a consumer in a retail store.

Figure 1:
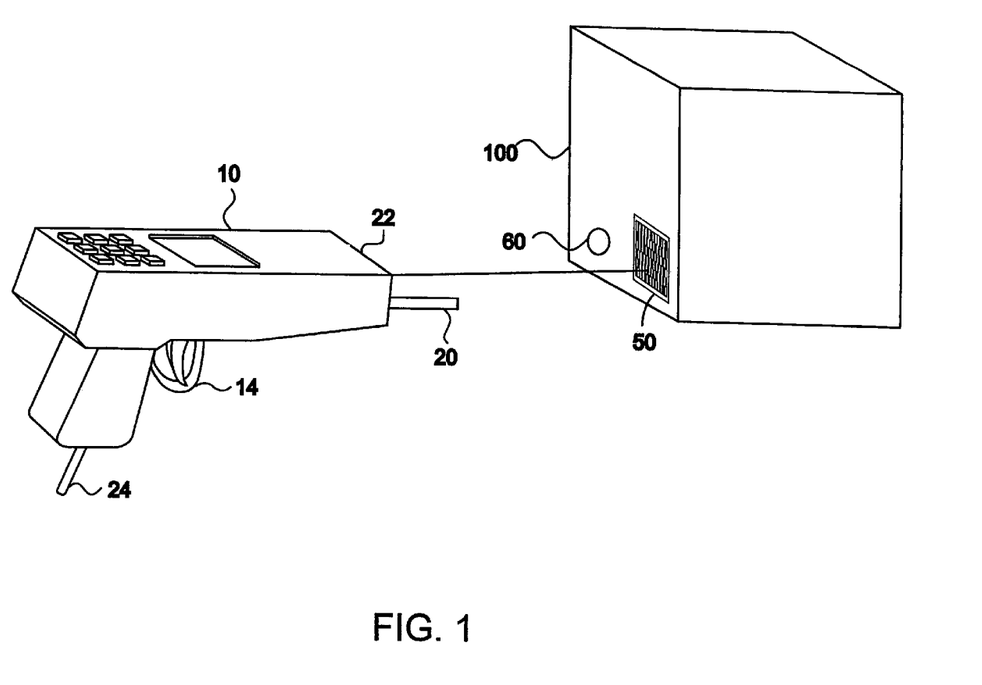
FIG. 1 schematically illustrates a dual function reader device and a carrier unit in accordance with the present invention.

Referring to FIG. 1, RF tag 60 associated with a carrier unit 100 responds to a RF interrogation signal generated by a RF interrogating device. The interrogating device is a dual combined function optical read and RF read reader 10, described below, which is illustrated as being a hand-held inventory control device capable of being attached by a tether 24 to a warehouse forklift (not shown) or other large device having its own power source, or may be a portable self-powered reader carried by an individual operator. The interrogating device could otherwise be a stationary device, such as a base station (not shown) located in close proximity to where the carrier unit 100 is being temporarily stored. A RF response signal generated by the RF tag 60 contains the identity of the carrier unit 100, the goods stored within or on carrier unit 100, the source, destination, price and other data regarding the goods or the carrier unit 100, such as shelf-life or storage temperature information for the goods. A computer (not shown) coupled to the interrogating device may utilize this information to track the carrier unit 100 and/or the goods.

These carrier units 100 also come marked or labeled with an optical bar code label 50, known in the art. These one-dimensional or two-dimensional bar codes typically provide only limited information about the carrier unit 100, such as the identity of the source of the carrier unit 100, or the destination of the carrier unit 100 and/or the goods associated therewith.

To provide additional information about the carrier units 100 and the goods, RF tags 60 are used. A RF tag 60 is affixed to the goods themselves (not shown), is affixed to an outer surface of the carrier unit 100 as shown, or is embedded within the structure of the carrier unit 100 (not shown).

Still referring to FIG. 1, in general, the present invention utilizes the dual function reader 10 to obtain information regarding a particular carrier unit 100, or regarding the goods stored on or within the carrier unit 100. A selected carrier unit 100 is approached by an operator (not shown) holding the reader 10. The operator then points the reader 10 at the optical bar code 50 on the selected carrier unit 100 and pulls the trigger 14 for an optical read operation. The reader 10 performs an optical read of the optical bar code 50. A successful read causes an indicator light (not shown) associated with the bar code 50 to be illuminated in a blinking pattern, or otherwise. The indicator light is located on the bar code label 50, or is otherwise located on an outer surface of the carrier unit 100 so it is easily observable by the operator. The information obtained by the read operation is displayed on a display window (not shown) on the reader 10.

The operator can then decide to perform a separate RF read operation of any RF tag 60 associated with the carrier unit 100, or with the goods stored in or on the carrier unit 100, based on the information obtained from the optical read operation. If the optical read information reveals that the carrier unit 100 does not contain the type of goods the operator was searching for, then no RF read need be performed and the next carrier unit 100 is selected.

If the optical read operation reveal that the operator has selected the proper carrier unit 100, an RF read operation is performed to obtain additional information about the carrier unit 100 or the goods. The optical read may provide the reader 10 with the specific identification of the carrier unit 100, or the goods, which may include a specific RF tag address for an RF tag 60 disposed on, or within, the carrier unit 100, as previously described. The RF read operation initiates a transmission sequence which is transmitted to the RF tag 60 via the reader 10. Other RF tags in the vicinity associated with other carrier units may also receive the RF transmission sequence, but they do not respond to the transmission signal since their respective specific identification code, or address, has not been transmitted. Only the RF tag 60 having the corresponding identification code or address will respond to the RF transmission signal with a responsive data sequence transmission.

An operator, in accordance with the present invention, can write information to the RF tag 60, as well. The RF tag 60 for a carrier unit 100 may need to be updated with a more current inventory of the goods being stored within, or on, the carrier unit 100. Additionally, if the carrier unit 100 destination changes while in transit, this information could also be updated by the operator. In general, any information included within the RF tag 60 could be modified by an operator, unless it was read-only, or otherwise write protected, data.

Figure 2:
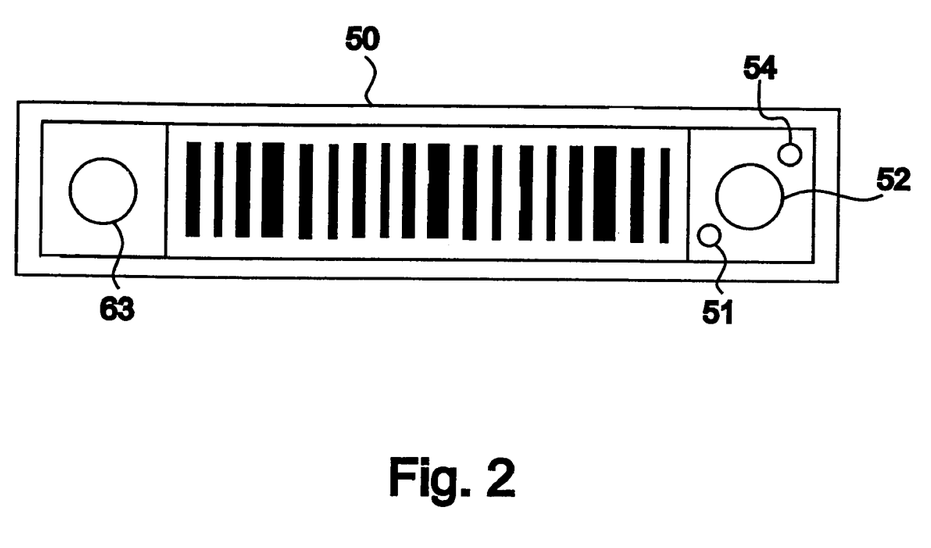
FIG. 2 schematically illustrates an optical bar code label in accordance with the present invention.

FIG. 2 illustrates schematically a typical optical bar code 50 printed on a label. Various formats for bar codes are known to those in the art. Indicator light 52 is disposed on a portion of, or in close proximity to, bar code 50 label. The function of indicator light 52 in regard to the present invention will be explained below.

Figure 3:
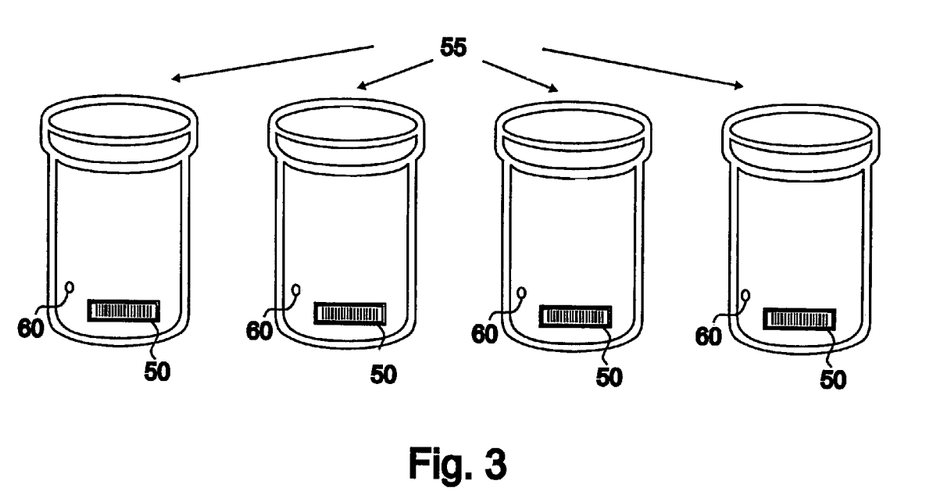
FIGS. 3–5 illustrate various embodiments of carrier units in accordance with the present invention.
Figure 4:
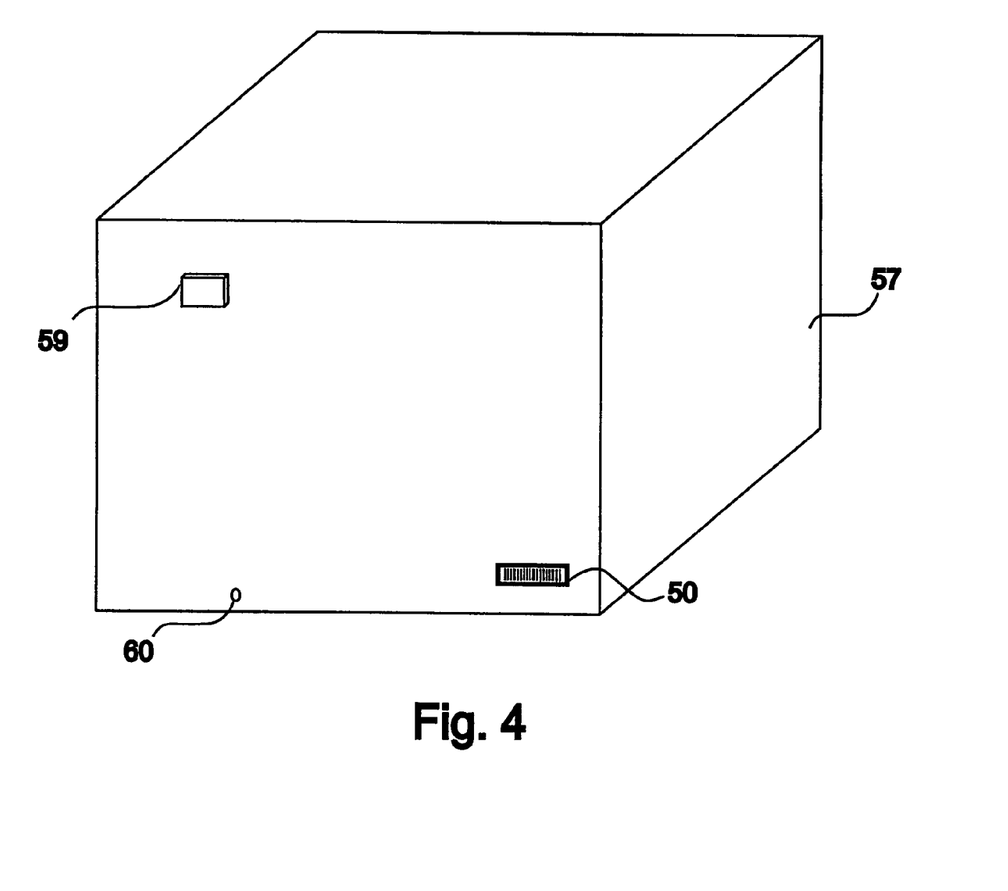
Figure 5:
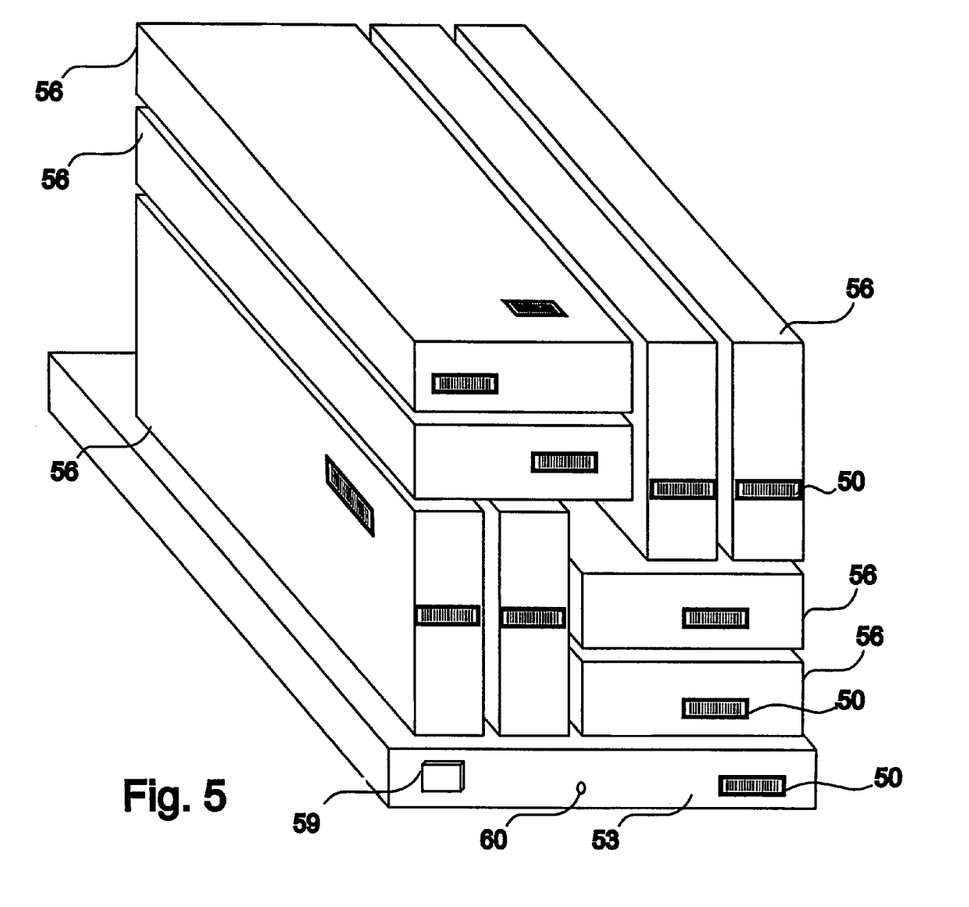

FIGS. 3–5 illustrate various embodiments of carrier units having an optical bar code 50 label attached thereto. Each figure illustrates a RF tag 60 attached to the respective carrier shown. In FIG. 3, the carrier units are drums 55 which are 55 gallon drums storing solid or liquid chemicals, or other agents. Each drum 55 includes a bar code 50 affixed to, or printed on, an outer surface. Information on the bar code 50 is typically limited to the identity of the contents of the drum 55, with possible additional information concerning the source or destination of the drum 55, and/or the toxicity of its contents. Similarly, a bar code 50 label affixed to, or printed on, the crate 57 of FIG. 4, or on the stacked boxes 56 stored on pallet 53 of FIG. 5, contains only limited information, as previously mentioned.

Figure 6:
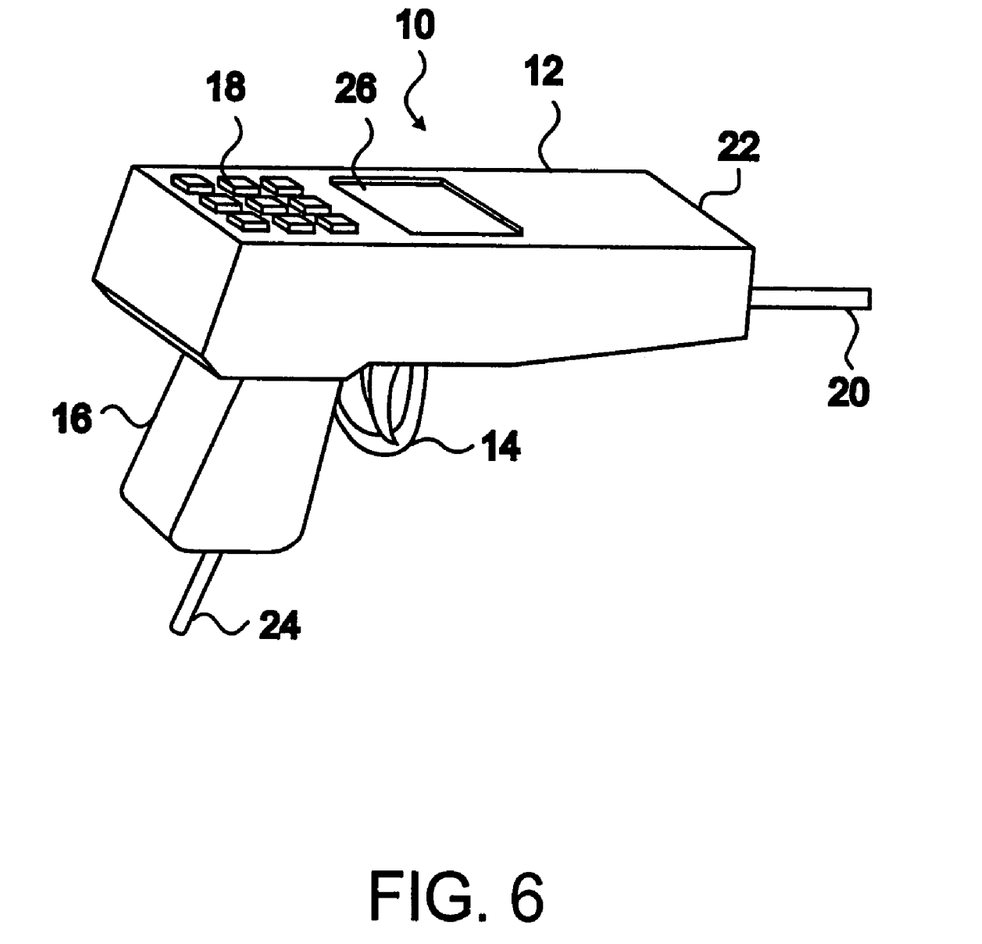
FIG. 6 illustrates an embodiment of a dual function reader device in accordance with the present invention.

FIG. 6 illustrates a dual function reader 10 used in accordance with the present invention. The reader 10 includes a gun-shaped housing 12, a handle 16, a trigger 14, a radio frequency (RF) antenna 20, a data entry device 18, a scanning window 22 and a display window 26. Trigger 14 may be a single trigger or a plurality of triggers—one trigger for each of a plurality of dedicated functions, such as an optical read function or a RF read function. Antenna 20 provides two-way RF communication between reader 10 and a RF tag 60, as discussed elsewhere herein. Scanning window 22 allows the bar code scanner circuit 34 (FIG. 7) disposed within reader 10 to illuminate optical bar codes for receipt of the data by reader 10 for storage, processing and/or displaying by reader 10.

The reader 10 is configurable into one of a plurality of functional modes of operation. In one mode of operation, an operator aims reader 10 at the optical bar code 50 of a carrier unit 100. The operator then squeezes trigger 14 on reader 10 to perform an optical read of bar code 50. The operator must be in line of sight of the desired carrier unit 100. If the data received by the optical read, and displayed on the reader 10, indicates the desired carrier unit 100 has been located, the operator then squeezes trigger 14 to perform a RF read of RF tag 60 of carrier unit 100.

In another mode of operation, the operator first squeezes trigger 14 to perform a RF read operation on RF tag 60 of a carrier unit 100. The operator need not be in line of sight of the carrier unit 100. If the RF read operation is successful, and the operator needs to read additional information from the optical code 50, the desired carrier unit 100 is physically located and trigger 14 is squeezed to perform an optical read operation.

In an additional mode of operation, the operator squeezes trigger 14 after locating the desired carrier unit 100 to perform a simultaneous RF read operation and optical read operation on RF tag 60 and optical bar code 50, respectively.

In a still further mode of operation, suited for situations where there are numerous carrier units 100 in close proximity to one another, an operator aims reader 10 at a desired carrier unit 100 and squeezes trigger 14 to first perform an optical read to determine whether the carrier unit being aimed at is the desired carrier unit. Data is obtained from the carrier unit regarding its identification information, contents, destination, etc. Once the reader 10 obtains the identification information from the optical read operation, reader 10 automatically performs a RF communication sequence with the RF tag 60 associated with that desired carrier unit 100. The identification of the RF tag of that desired carrier unit 100 is used during the RF communication sequence to communicate only with the RF tag 60 of the desired carrier unit 100. A RF write operation may also be performed to write data to RF tag 60 via reader 10.

Reader 10 includes a battery pack 38 (FIG. 7) which includes a single battery or a plurality of batteries. The batteries are rechargeable. An optional tether 24 (FIG. 6) connects reader 10 to an external power source (not shown). In a warehouse setting, the tether 24 connects the reader 10 to a power outlet on a forklift or other vehicle, or to a power outlet installed within the warehouse infrastructure. The power outlet may be for an ac or a dc voltage source. The battery pack 38 of the illustrated reader 10 is a dc power source which can be recharged by connecting the tether 24 to an external power source, as described. The data entry device 18 may be a keypad, a liquid crystal display (LCD) touch screen, or other similar data entry device used to manually input data to reader 10. Display window 26 is a light emitting diode (LED) display, a LCD device, a cathode ray tube (CRT) display, or other similar device known in the art for displaying information on a hand-held low power, battery operated device.

Figure 7:
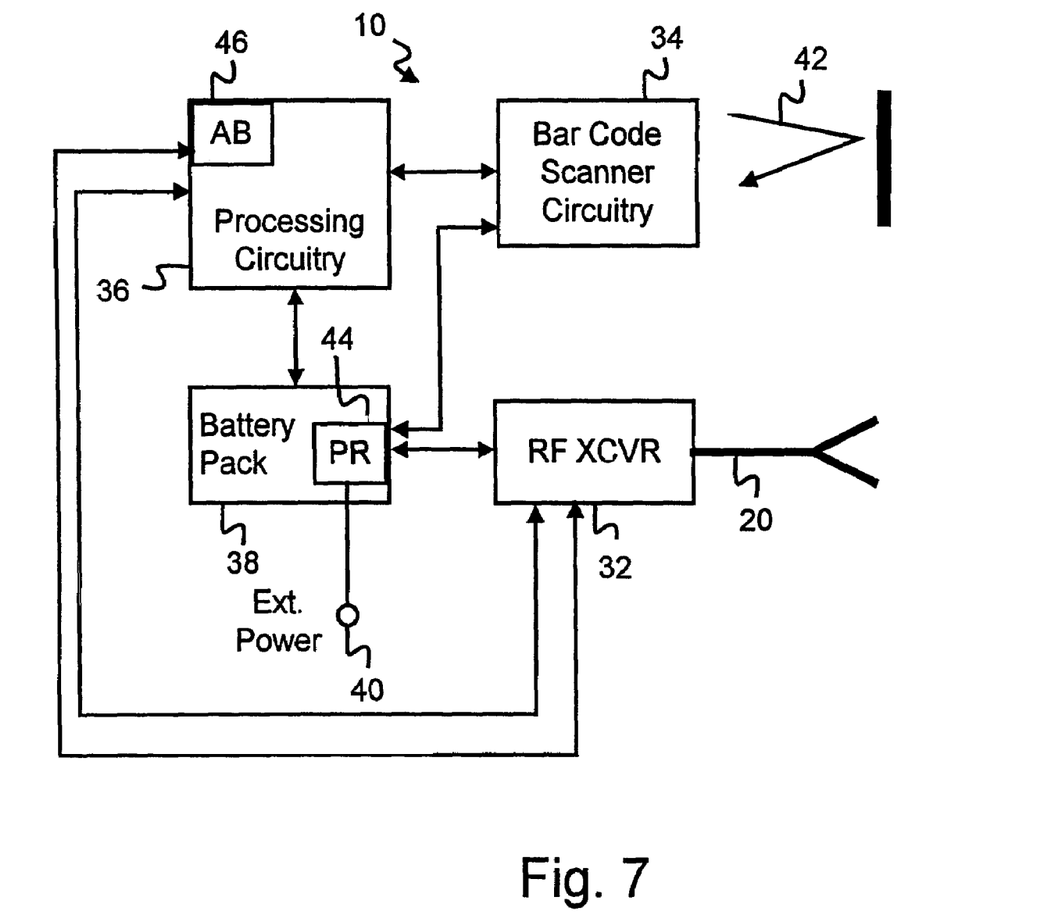
FIG. 7 schematically illustrates the internal components of the reader device of FIG. 6.

Referring to FIG. 7, a block diagram schematic of an embodiment of the internal components of reader 10 is illustrated. Antenna 20 is coupled to RF transceiver 32, which is in turn coupled to processing circuit 36. Optical bar code scanner circuit 34, which is also coupled to processing circuit 36, transmits and receives light signals 42 via scanning window 22 (FIG. 6) of reader 10. Various implementations of optical bar code scanner circuits are known in the art. The data received from the optical read operation of the bar code 50 is provided to the processing circuit 36 by the scanner circuit 34. Processing circuit 36 then forms a transmission signal to be transmitted, via RF transceiver 32, to a RF tag 60 associated with the carrier unit 100 that was optically read. The transmission signal will be specifically addressed to the associated RF tag for the carrier unit based on the address or code obtained during the optical read operation.

If an optical read operation of a bar code is successful, scanner circuit 34 generates a data read signal that is provided to processing circuit 36 to indicate a successful optical read. In another embodiment, processing circuit 36 may itself generate the data read signal for a successful optical read operation of a bar code. In one embodiment, the data read signal is used by processing circuit 36 to generate an enable signal which is provided to RF transceiver 32. This enable signal enables transceiver 32 to perform a RF read operation, upon completion of a successful optical read operation. Processing circuit 36 also includes a manual selection function, selected by an input on data entry device 18 (FIG. 6), which allows either an optical read operation by enabling scanner circuit 34, or allows a RF read operation by enabling RF transceiver 32. It is desirable to limit the use of RF transceiver 32 while reader 10 is powered by battery pack 38 to extend the life of the battery pack 38.

Battery pack 38 supplies power to all the components of reader 10, as illustrated. An external power connection 40 couples to tether 24 (FIG. 6) and supplies power to power regulator circuit 44, shown as part of battery pack 38. Power regulator circuit 44 provides ac to dc conversion functions, current limiting functions, and other functions necessary and known to those in the art for supplying the circuitry of reader 10 with external power from an ac or a dc source. Power regulator circuit 44 may otherwise be formed as a portion of processing circuit 36, or may be a standalone circuit within reader 10.

An automatic backup circuit 46, illustrated as part of processing circuit 36, is utilized to automatically enable RF transceiver 32 if a data read signal is not generated a predetermined period of time after scanner circuit 34 first attempts to read an optical bar code for a selected carrier unit 100. The backup circuit 46 may be configured such that after a certain number of attempts to read a bar code, it would automatically enable RF transceiver 32 and send a message to the display 26 (FIG. 6) of reader 10 that the optical read was unsuccessful and that RF read operation is now enabled. Otherwise, a timeout period could be assigned to an optical scan operation, after which if an optical read is unsuccessful, the RF transceiver 32 could be enabled by automatic backup circuit 46. Automatic backup circuit 46 is disabled while reader 10 is not drawing power from an external power source via external connection 40.

Figure 8:
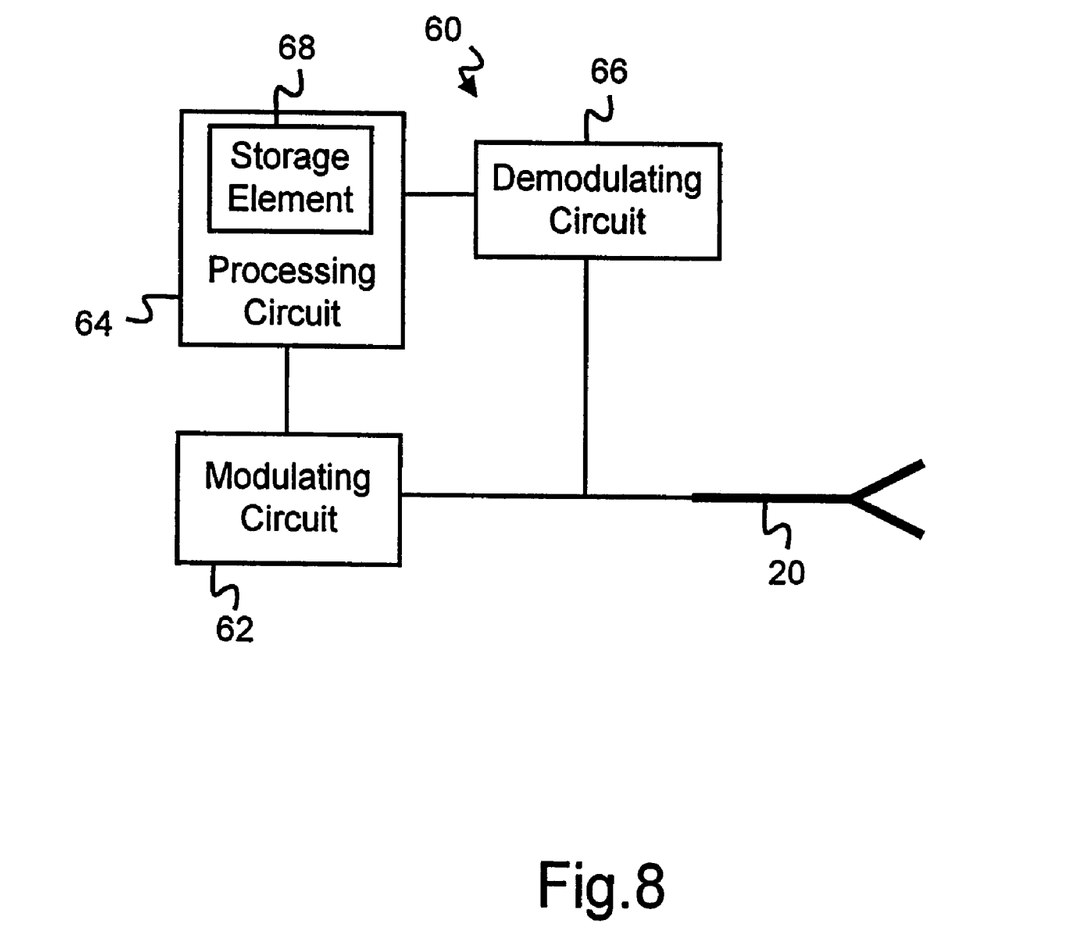
FIG. 8 is a block diagram of an embodiment of an RF tag in accordance with the present invention.

Referring to FIG. 8, a RF tag 60 is illustrated, including an antenna 20, which may be a coil, demodulating circuit 66 and a tag processing circuit 64. Modulating circuit 62 may be as simple a circuit as a transistor coupled to the antenna 20 and connected to ground, such that as the tag transmission sequence is received from processing circuit 64 to be transmitted to reader 10, the logical ones and zeros comprising the tag sequence will cause the transistor to short, or shunt, the antenna 20 to ground when a logical one is received, in one embodiment, or when a logical zero is received, in an alternative embodiment. Processing circuit 64 includes a memory element 68 which stores a tag sequence and other data for RF tag 60. Various other modulating circuits of varying degrees of complexity are well known in the art.

In the operation of RF tag 60, a transmission from reader 10 is received by RF tag 60 via antenna 20 and is provided to demodulation circuit 66 where the signal is demodulated using known methods. The demodulated received signal is then provided to processing circuit 64, which includes storage element 68 which includes data about the carrier unit 100 or the goods stored within or on the carrier unit 100, such as the source, destination, price, preferred storage temperature, current temperature, stress/pressure, biological process analysis, etc. Processing circuit 64 includes logic which determines whether the demodulated received signal is addressing the RF tag 60. If so, a data sequence from storage element 68 is provided to modulating circuit 62 for transmission via antenna 20 to the interrogating reader 10 as a data sequence transmission signal. If RF tag 60 is not being addressing by the reader 10, the demodulated signal will not match the specific address code stored in processing circuit 64 and no responsive data sequence signal will be transmitted by the RF tag 60.

RF tag 60 emits a response to the transmission signal from reader 10 using backscatter modulation to communicate data. An energizing field emitting with the transmission from reader 10 is, in one embodiment, in the form of a carrier wave signal at a fixed frequency. This transmitted energy is received by the coil, or antenna 20, of the RF tag 60, is rectified or otherwise processed by demodulating circuit 66, and is used to power the RF tag 60, which is typically a passive RF tag having no internal power source. RF tag 60 decodes its address in processing circuit 64, matches it against the address, or code, stored in storage element 68, and sends a response if the proper code or address is received and decoded. The response is a modulated RF signal at a frequency different than that of the transmission signal from reader 10. The response signal is typically in the form of a data stream which may include a clock signal and various data regarding the carrier unit, the goods, or both. This generated data sequence may be in the form of a modified manchester encoded signal at a frequency that is shifted from the original transmission signal. The data sequence from RF tag 60 is used to drive a shorting, or shunt, transistor (not shown) connected across the antenna 20. This has the effect of changing the reflectivity of the RF tag antenna 20 and causes some of the received energy from the reader 10, and a clock signal, to be reflected back towards reader 10. The RF tag 60 acts as a field disturbance device by reflecting the incident RF transmission signal from reader 10 in a coded manner. This reflected energy may take the form of data packets.

A simple receiver circuit (not shown) on the RF transceiver 32 (FIG. 7) of reader 10 uses, in one embodiment, the received RF tag 60 clock signal as a local oscillator to decode the received data signal from RF tag 60 to extract the modified manchester encoded data. In other embodiments, the tag sequence is used to directly modulate the signal from RF tag 60 and no clock is transmitted by the RF tag 60.

Figure 9:
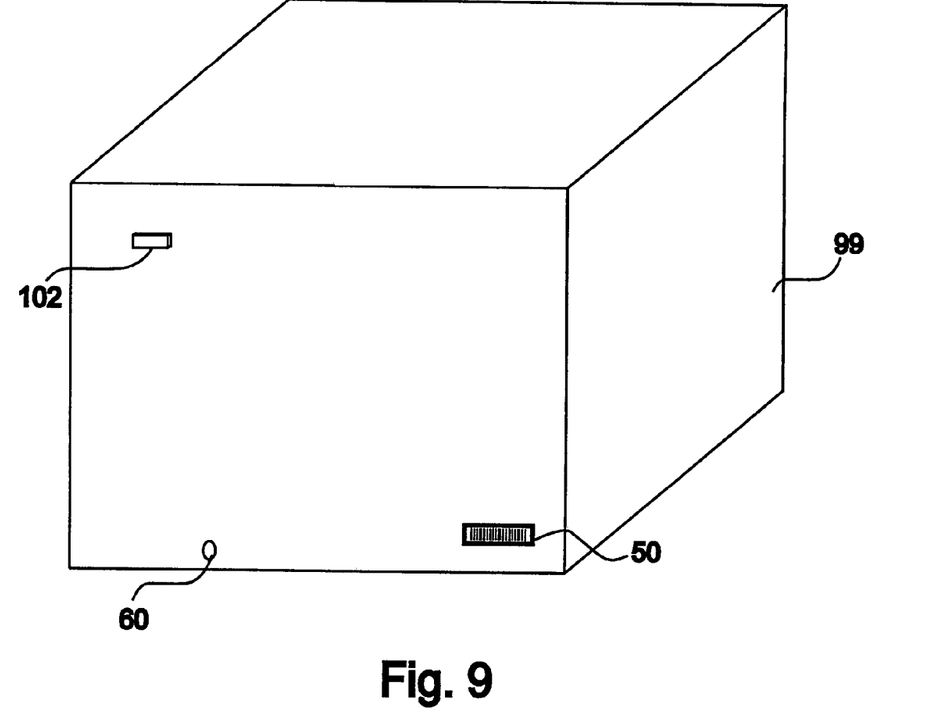
FIG. 9 schematically illustrates a carrier unit and a biological sensor in accordance with the present invention.

Information regarding the status of a biological process for goods within the carrier unit is provided by a biological sensor microchip that senses chemical and biological substances in real time. Such a sensor has been developed by Texan Instruments, and is schematically depicted as biological microchip sensor 102 attached to a carrier unit 100 of FIG. 9. The level of E-coli bacteria, for example, could be tracked by the sensor which would provide, in real-time, that information to the RF tag. A RF read of the RF tag by an operator would provide the bacterial information to the reader. The operator could then determine whether the bacteria level is above a safe level.

Figure 10:
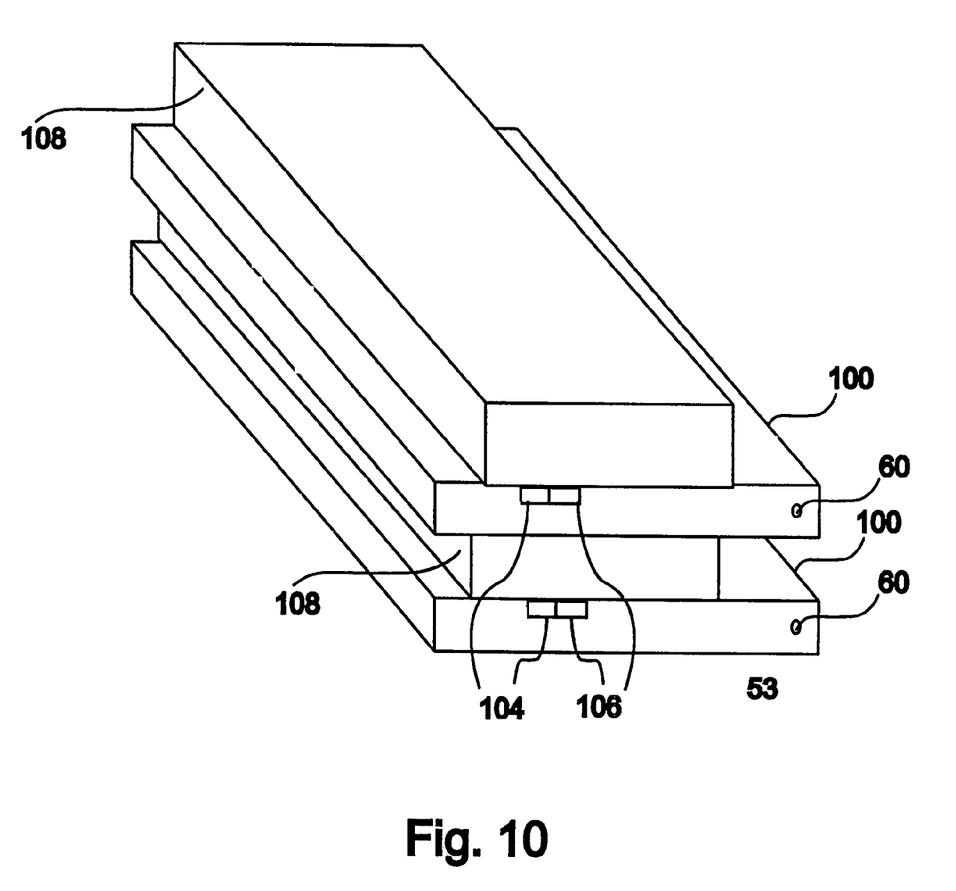
FIG. 10 schematically illustrates a stack of carrier units and shipping crates, including a pressure sensor, in accordance with the present invention.

Referring to FIG. 10, information regarding stress/pressure on a carrier unit 100 could be obtained from information regarding pressure and wall shear stress being applied to one or a plurality of carrier units 100. For example, when a carrier unit 100, particularly a shipping pallet containing a shipping crate 108, is stacked, great pressure and stress is exerted on the bottommost carrier unit and shipping crate 108, which may cause either to fail and break or be crushed. Excessive pressure on the carrier unit 100 would cause damage to the goods within the carrier unit 100 as well, costing time and money to replace the damaged goods and have them reshipped. A micro transducer and/or micromachined pressure microsensor 104 is embedded on or within one or a plurality of carrier units 100. Various configurations of micro transducers and micromachined pressure microsensors are known in the art. Information regarding excessive pressure is read directly from the pressure sensor 104, or is provided to the RF tag 60 on the carrier unit 100. An operator is alerted of the potential failure. In another embodiment, the RF tag 60 or pressure microsensor 104 has a power source 106 which allows microsensor 104 to broadcast the warning, giving the carrier unit identification, to a local base station, described below with regard to FIG. 11. A central computer (not shown) coupled to the base station could then store the warning and/or sent an alert message to a system operator.

Figure 11:
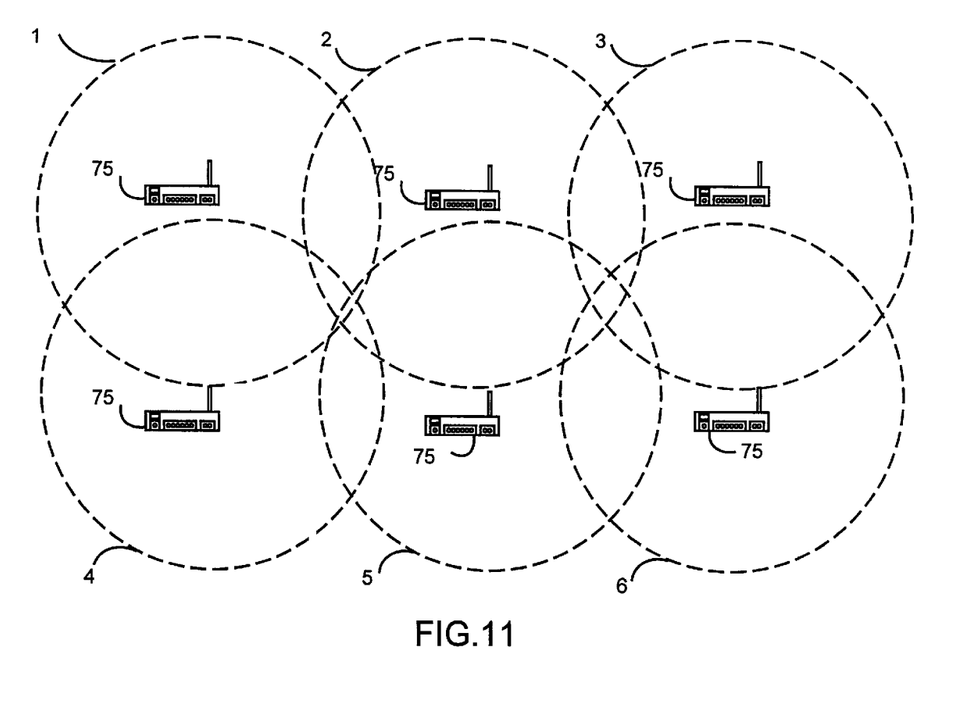
FIG. 11 illustrates an embodiment of a grid system for a carrier unit location system in accordance with the present invention.

Referring to FIG. 11, an embodiment of a grid system for a carrier unit location system in accordance with the present invention is illustrated. A warehouse, or other large storage area, may be sectioned into cells. FIG. 11 shows a warehouse building divided into six cells. Many carrier units are typically contained in each cell. If an operator wanted to move a particular carrier unit from the warehouse to load onto a truck, for example, the operator needs to be able to quickly find the carrier unit. Upon arrival at the warehouse, the cell storage location for the carrier unit is recorded, but the exact location within the cell is not. Since each cell may be relatively large, it is important for the operator to be able to quickly ascertain the location of the carrier unit after arriving at the cell of the carrier unit. Each cell may include a base station 75 which can be programmed to send a transmission signal addressed, or otherwise coded, for the specific carrier unit being located. The operator may also initiate the delivery of information regarding the identification of the carrier unit into the base station 75, via keyboard entry directly at the base station 75, or via wireless transmission to the base station 75 from a remote wireless data input device (not shown). A main computer (not shown) coupled to each base station 75 via wired or wireless communication sends the appropriate base station 75 the carrier unit identification information for the that cell.

Regardless of the method used, a base station 75 transmits the transmission signal for the carrier unit, which upon receipt by a RF tag attached to the carrier unit causes an indicator light 52 on the carrier unit to illuminate. The indicator light 52 may be disposed on bar code 50, as shown in FIG. 2, or may otherwise be located in close proximity to the bar code 50. In either embodiment, a small power source 54 and a light sensor 51 are coupled to the indicator light 52. When the light from scanner window 22 of reader 10 is detected by light sensor 51 tuned to detect light of a predetermined frequency, it causes the indicator light 52 to turn on and illuminate. Various implementations of circuitry to perform this function are known in the art. Additionally, the use of small, low powered batteries are known in the art. The illumination may be steady or any on/off or blinking pattern. The indicator light 52 may or may not be located on the optical bar code label, as discussed above. By illuminating the indicator light 52, the specific carrier unit with a given cell is quickly and easily identified. The carrier unit can then be optically read and/or RF read as described above, or simple moved out onto a truck or other transport medium.

In another embodiment, a RF tag enable button 63 (FIG. 2) is attached to the carrier unit. Button 63 may be in close proximity to bar code 52 label for ease of operation. An operator approaches a carrier unit 100 to be read by reader 10, pushes button 63 and reads information from the RF tag 60. Pushing button 63 enables the RF tag 60 to be read by reader 10. Otherwise, without button 63 being pushed, the RF tag 60 does not respond to reader 10.

A small low-powered radio 59 (FIGS. 4 and 5) is attached to the carrier units 57 and 53, respectively, where the radio 59 is configurable to two modes. One mode is a query mode, the other mode is a report mode. In query mode, a base station 75 (FIG. 11) sends an interrogation signal, including identification information, to a specific RF tag 60. The RF tag 60 decodes its own identification code and then transmits its data to the base station. In report mode, radio 59 periodically wakes up and transmits status information to a base station 75 (FIG. 11) or to an access point for a wired or wireless infrastructure network.

In another embodiment, once inside a desired cell (1–6) in the warehouse, the operator inputs the identification number for the carrier unit to be located and the reader 10 then transmits the signal addressed for the particular carrier unit. This step is accomplished prior to the RF read, discussed above. Upon receipt of the transmission signal by an RF tag associated with the carrier unit, indicator light 52 of the desired carrier unit will illuminate, as previously described.

In summary, the present invention includes a system and method which utilizes a dual function reader, which may be a hand-held inventory control device, which first performs an optical read of an optical bar code on a carrier unit, then based on the identification or other information obtained from the optical read a RF read is made of a RF tag attached to, or within, the carrier unit. An indicator light on the carrier unit illuminates when the optical read is completed, which allows an operator to visually verify that the optical read has transpired for the desired carrier unit. The RF tag provides data regarding the inventory of the goods stored within, or on, the carrier unit, the temperature of the goods, the shelf-life of the goods, the source and/or destination of the carrier unit and/or the goods, and other pertinent information. Data can also be written to the RF tag by the reader.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

The invention claimed is:

1. A dual mode article identification system for goods stored by a carrier unit, comprising:
   a dual mode reader device;
   a temporary carrier unit for storing articles of commerce;
   an optical bar code disposed on said temporary carrier unit;
   a radio frequency transponder device disposed on said temporary carrier unit; and
   a plurality of goods stored by said temporary carrier unit;
   wherein said reader device said optical bar code and communicates with said radio frequency transponder device;
   said reader device generating information based on the reading of said optical bar code, and said reader device utilizing the generated information in communicating with said radio frequency transponder device,
   further comprising an indicator light disposed on said carrier unit in close proximity to said optical bar code.

2. The system of claim 1, further comprising a biological sensor device for sensing biological activity for said goods.

3. The system of claim 1, further comprising a pressure sensor for sensing pressure exerted on said carrier unit.

4. The system of claim 1, further comprising a sensor for providing status data to said radio frequency transponder device.

5. A dual mode article identification system for goods stored by a carrier unit, comprising:
   a dual mode reader device;
   a temporary carrier unit for storing articles of commerce;
   machine readable information disposed on said temporary carrier unit;
   a radio frequency transponder device disposed on said temporary carrier unit; and
   a plurality of goods stored by said temporary carrier unit;
   wherein said reader device reads said machine readable information and communicates with said radio frequency transponder device;
   said reader device generating information based on the reading of said machine readable information, and said reader device utilizing the generated information in communicating with said radio frequency transponder device,
   wherein said reader device includes an optical scanner portion for reading the machine readable information and a radio frequency transceiver portion,
   further comprising an indicator light disposed on said carrier unit in close proximity to said machine readable information.

6. The system of claim 5, further comprising a biological sensor device for sensing biological activity for said goods.

7. The system of claim 5, further comprising a pressure sensor for sensing pressure exerted on said carrier unit.

8. The system of claim 5, further comprising a sensor for providing status data to said radio frequency transponder device.

9. A method of communicating between a reader device, and a wireless communication device having associated machine readable information containing communication control information which enables communication with the wireless communication device via the radio frequency spectrum, the method comprising the steps of:
   reading the machine readable information using the reader device to obtain the communication control information; and
   establishing communication via the radio frequency spectrum between the reader device and the wireless communication device based upon the communication control information received from the reading of the machine readable information.

10. The method of claim 9, wherein the communication control information is used to enable addressing the wireless communication device via the radio frequency spectrum.

11. The method of claim 9, wherein the wireless communication device is a radio frequency tag, and the reader device reads the information from particular machine readable information associated with a particular radio frequency tag so as to receive communication control information which enables communication via the radio frequency spectrum with the particular radio frequency tag to the exclusion of other radio frequency tags not associated with the particular machine readable information.

12. The method of claim 9, wherein the wireless communication device is a radio frequency tag, and the reader device the information from particular machine readable information associated with a particular radio frequency tag so as to receive communication control information which enables communication via the radio frequency spectrum with the particular radio (RF) tag to the exclusion of other radio frequency tags not associated with the particular machine readable information, the communication control information from the particular machine readable information enabling the addressing via the radio frequency spectrum of the particular radio frequency tag to the exclusion of radio frequency tags not associated with the particular machine readable information.

13. A method of communicating between a reader and radio system, and a wireless communication device having associated readable information which enables communication with the wireless communication device via the radio frequency spectrum, said method comprising the steps of:
   reading the readable information using the reader and radio system to obtain the communication enabling information; and establishing communication via the radio frequency spectrum between the reader and radio system and the wireless communication device based upon the communication enabling information received from the reading of the readable information.

14. The method of claim 13, wherein the communication enabling information is the address of the wireless communication device.

15. The method of claim 13, wherein the communication enabling information is the address of the wireless communication device, and the wireless communication device is a radio frequency identification transponder.

16. The method of claim 13, wherein the communication enabling information is the address of the wireless communication device, and the wireless communication device is a radio frequency identification transponder for transmitting via the radio frequency spectrum information concerning goods with which the transponder and the readable information are associated.

17. The method of claim 13, wherein the communication enabling information is the address of the wireless communication device, and the wireless communication device is a radio frequency identification transponder, wherein the reader and radio system is within communication range of a plurality of such radio frequency transponders each having associated readable information that enables communication eexclusively with that particular radio frequency transponder, and the reader and radio system reading the readable information associated with one of the radio frequency transponders and utilizing the communication enabling information in the form of the address of the one of the radio frequency transponders to communicate exclusively with the one radio frequency transponder to the exclusion of the other radio frequency transponders within communication range of the reader and radio system.

18. The method of claim 13, wherein a carrier for the readable information has an indicator light associated therewith.

19. The method of claim 13, wherein an indicator light is associated with a carrier having the readable information thereon, and the indicator light is energized to identify the carrier when such carrier receives a radio frequency transmission signal for such carrier.

20. The method of claim 13, wherein an indicator light is associated with a carrier having readable information thereon, and the indicator light is energized to identify the carrier when such carrier receives optical reading energy.

21. Apparatus comprising a reader and radio system, and a wireless communication device having associated readable information which enables communication with the wireless communication device via the radio frequency spectrum, said reader and radio system reading the readable information to obtain the communication enabling information; and said reader and radio system establishing communication via the radio frequency spectrum with wireless communication device based upon the communication enabling information received from the reading of the readable information.

22. The apparatus of claim 21, wherein the communication enabling information is the address of the wireless communication device.

23. The apparatus of claim 21, wherein the communication enabling information is the address of the wireless communication device, and the wireless communication device is a radio frequency identification transponder.

24. The apparatus of claim 21, wherein the communication enabling information is the address of the wireless communication device, and the wireless communication device is a radio frequency identification transponder for transmitting via the radio frequency spectrum information concerning goods with which the transponder and readable information are associated.

25. The apparatus of claim 21, wherein the communication enabling information is the address of the wireless communication device, and the wireless communication device is a radio frequency identification transponder, wherein the reader and radio system is within communication range of a plurality of such radio frequency transponders each having associated readable information that enables communication only with a respective radio frequency transponder, and the reader and radio system reading the readable information associated with one of the radio frequency transponders and utilizing the communication enabling information in the form of the address of the one of the radio frequency transponders to communicate exclusively with the one radio frequency transponder to the exclusion of the other radio frequency transponders within communication range of the reader and radio system.

26. The apparatus of claim 21, wherein a carrier for the readable information has an indicator light disposed in proximity thereto.

27. The apparatus of claim 21, wherein an indicator light is disposed in proximity to a carrier having the readable information thereon, and the indicator light is energized to identify the carrier when such carrier receives a radio frequency transmission signal for such carrier.

28. The apparatus of claim 21, wherein an indicator light disposed in proximity to a carrier having readable information thereon, and the indicator light is energized to identify the carrier when such carrier receives optical reading energy.

* * * * *